Nov. 29, 1960    C. A. GARVER ET AL    2,962,262
AUTOMOBILE JACK CONVERTER

Filed Nov. 13, 1957    2 Sheets-Sheet 1

INVENTORS
CURTIS A. GARVER
CHARLES R. HAUN
BY

ATTYS.

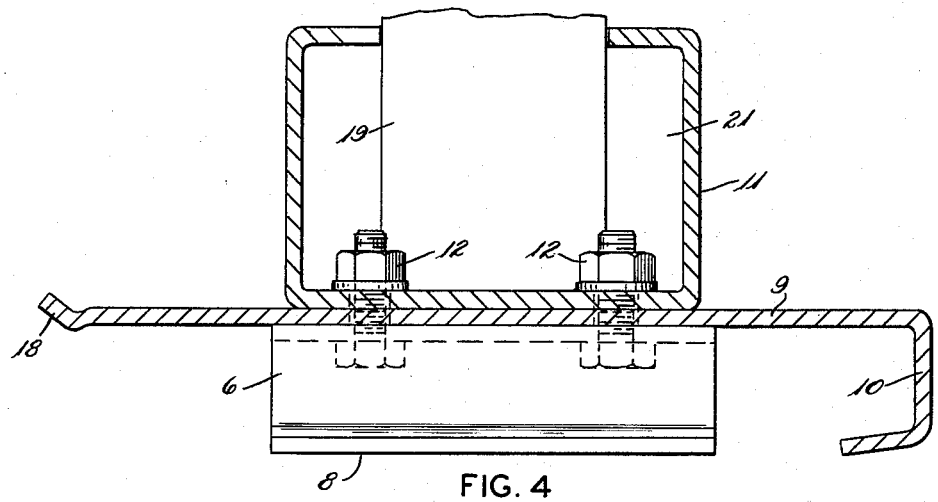
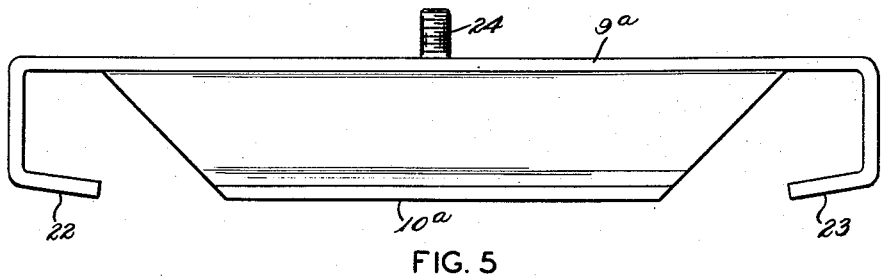

2,962,262
AUTOMOBILE JACK CONVERTER

Curtis A. Garver, 7 N. Monroe St., and Charles R. Haun, both of Millersburg, Ohio Filed Nov. 13, 1957, Ser. No. 696,212

3 Claims. (Cl. 254—134)

This invention relates to automobile jacks of the type called "floor jacks" in the industry and especially relates to converters or attachments for such jacks to adapt them for improved lifting action on vehicles and the like.

Heretofore there have been many different types of hydraulic jacks and other types of commercial jacks used on automobiles by service station operators and wherein some type of a support post has been provided. These support posts have been carried on a movable frame with a long control lever or the like provided on the frame so that the attendant can relatively easily engage the support post of the jack with the differential case of an automobile and lift that end of the vehicle from the floor. However, it is desirable in many late model cars to lift the frame of the vehicle and let the wheels be suspended as that lowers the wheels and facilitates changing the wheels. Some improved types of jacks have been made wherein the lifting members on the jack are adapted to engage the frame or bumper of a vehicle to provide lifting action from the ends of the vehicle. However, such new jacks are relatively expensive and it is difficult to have two heavy, bulky jacks around the average service station because of the cost, storage area required for the jacks, etc. so that some resistance exists to the purchase of new style jacks for engaging bumper frames or the like for secure lifting action.

The general object of the present invention is to provide a new and improved type of a converter or attachment for a floor jack characterized by its ability to adapt a standard differential engaging type or support post type of a jack over to a jack having a plurality of support arms thereon for engaging the bumper or frame members of a car.

Another object of the invention is to provide a sturdy, relatively inexpensive type of a converter than can be easily attached to a single support post of automobile jacks and convert them over to a bumper or frame engaging type of a jack construction where laterally spaced support arms can be provided.

Another object of the invention is to provide a special converter or attachment for a jack wherein adjustable plate and flange members are provided to adapt such converter to engage any normal size support plate or head on an automobile jack.

A further object of the invention is to provide a relatively inexpensive, uncomplicated attachment for a jack, which attachment is made from substantially conventional members at a minimum cost and which attachment is adapted to have an effective service life with any of a variety of sizes of support posts or plates of a heavy commercial automobile jack.

The foregoing and other objects and advantages of the invention will be made more apparent as the specification proceeds.

Reference now is directed to the accompanying drawings wherein:

Fig. 4 is a vertical section taken on line 4—4 of Fig. 2; and

Fig. 5 is a vertical section taken through a modified type of attachment plate of the invention.

When referring to corresponding parts shown in the drawings and referred to in the specification, corresponding numerals are used to facilitate comparison therebetween.

The present invention, in general, relates to an attachment unit or member for use with an automobile jack or the like and wherein a support platform is provided, the attachment comprising a securing plate having a pair of downwardly extending inwardly overhanging flange means at a pair of opposed edges thereof, and a third downwardly extending inwardly overhanging edge flange on a third edge thereof whereby such securing plate can be brought into engagement with the securing platform of an automobile jack, an extension member, means securing the extension member to the securing plate on the upper surface thereof, and spaced support arms carried by the extension member for engaging an automobile for lifting action thereon.

Figure 1:
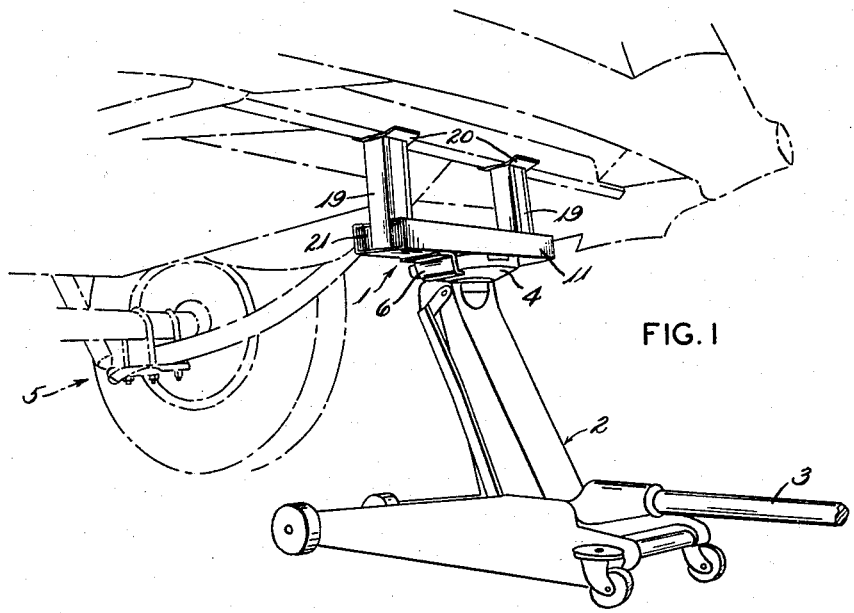
Fig. 1 is a perspective view of a converter embodying the principles of the invention engaged with a standard type automobile jack and with the members supporting an automobile.

Referring now to the details of the structure shown in the drawings, an attachment of the invention is indicated as a whole by the numeral 1 and this attachment is adapted for use with an automobile jack, or the like, having a support platform or the like lifting member thereon. Fig. 1 of the drawings best shows a conventional automobile jack 2 having a control handle, or lifting arm 3 provided thereon to control the vertical position of a support platform 4 that has overhanging edge portions thereon. The support platform 4 is normally used for engaging a differential, or other member of a vehicle 5 for lifting action thereon.

Figure 2:
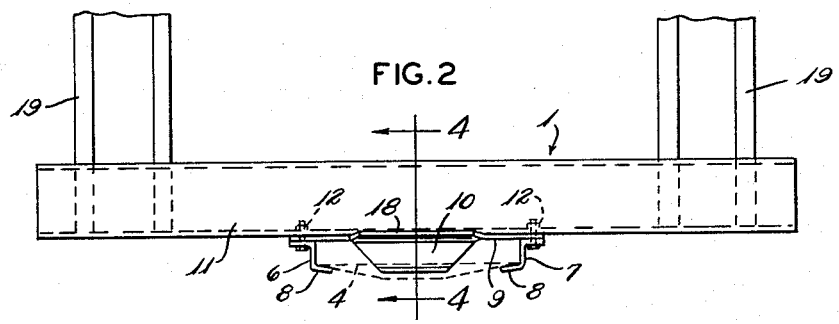
Fig. 2 is an elevation of the jack converter attachment of Fig. 1.
Figure 3:
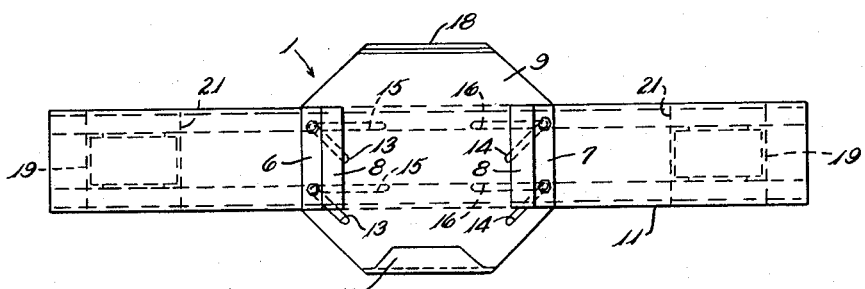
Fig. 3 is a bottom plan of the converter attachment of Fig. 1.

Figs. 2 and 3 of the drawings best show that a pair of side members 6 and 7 are provided and that each one of these members has a downwardly extending, inwardly overhanging flange 8 thereon. The side members 6 and 7 are positioned on, or operatively associated with opposed lateral margins of a securing plate 9 adapted to be positioned on and engaged with the support platform 4 of the jack 2 for affixing the attachment 1 of the invention thereto. Such securing plate 9 has an integral downwardly extending, inwardly overhanging flange 10 provided on a side margin thereof different from the side portions or margins having the side members 6 and 7 associated therewith. An extension channel member, or similar member 11, is provided in the attachment of the invention, and preferably is bolted, as by studs or bolts 12, to the securing plate 9 to protrude therefrom in a direction normally extending transversely of the vehicle 5.

These side members 6 and 7 are carried by the securing plate 9 in an adjustable manner so that the attachment 1 of the invention can be used with support platforms of different dimensions. In order to maintain such side members 6 and 7 on the center of the securing plate 9, pairs of parallel, diagonally inwardly extending slots 13 and 14 are provided in opposed marginal portions of the securing plate 9. These slots 13 and 14 are directed towards the third edge flange means 10 on the securing plate 9 as the positions of the side members 6 and 7 (and flanges 8) and the edge flange 10 will determine the then center portion of the securing plate 9 for engagement with a support platform 4 or the like of an automobile jack. To accommodate for the longitudinal movement of the side members 6 and 7 towards each other, the extension channel means or member 11 likewise has pairs of parallel slots 15 and 16 provided therein. Thus, the bolts, cap screws, or the like 12 extend through apertures provided in the side members 6 and 7, and with the bolts individually extending through one of the slots 13 or 14 and one of the slots 15 or 16 to secure the side members 6 and 7, securing plate 9 and extension channel member 11 together as an assembly for operation of the attachment unit of the invention. This unit made from the securing plate and means mounted thereon can be slid into engagement with the support platform 4 because of the open ended unit provided by the flanges 8, 8 and 10 for sliding or telescopic engagement with such support platform. A lip 18 may be provided on the securing plate 9 and be upwardly inclined to facilitate this sliding engagement with the support platform 4.

The actual support or car engaging means of the attachment 1 comprise a pair of support arms 19 that position arcuate top platforms 20 thereon. These top platforms 20 can be engaged with the frame or bumper means of a vehicle 5 for a lifting action thereon. Obviously these support arms 19 can be spaced transversely of a vehicle a length controlled by the length of the extension channel member 11. The support arms 19 have bases 21 shaped complementary to the inner surface of the extension channel means 11 so that the support arms 19 can be slid longitudinally thereof in the top opening, or slot in such extension channel means without any special holding or lock members being needed to position the support arms for load carrying action. Of course, the support arms 19 could be bolted in desired positions on the extension channel member, if desired.

It will be seen that the support arms 19 can be released from engagement with the extension channel member 11 at the ends thereof but otherwise are fixedly held to extend in a vertical direction by engaging the overhanging channel or flange means at the top portion of the extension channel member 11. Other types of support arms and extension members can be used, if desired.

Individual slots may replace the parallel slots 13, 14, 15 and 16, if desired, as long as portions of the slots overlie each other to provide for assembly of the side members, securing plate and extension member together.

A modified type of a securing plate 9a is shown in Fig. 5 of the drawings. In such securing plate, a pair of opposed downwardly directed, inwardly overhanging, integral flanges 22 and 23 are formed on opposed margins of the securing plate, whereas a third flange 10a is formed on a third side edge of the securing plate. Hence the securing plate 9a is not adjustable but can be made in various sizes to fit on a jack plate or head for use with various cars. Hence, in this instance, if desired, the securing plate 9a has threaded studs 24 secured thereto and extending upwardly therefrom for extending through an associated extension member to position support means of the attachment unit in operative association with an automobile jack. Of course, removable bolts can be used for attaching the securing plate and extension channel member, or equivalent member together.

It will be realized that the side members 6 and 7 comprise flanges, or flange means operatively carried by the securing plate 9.

It should be realized that any desired type of transversely extending extension unit can be carried by the securing plates of the invention as such securing plates provide a novel means for fixed engagement with a commercial automobile jack to provide spaced members for engaging an automobile vehicle or the like in the frame or bumper, or equivalent portions thereof.

In view of the foregoing, it is believed that the objects of the invention have been achieved and that a novel, useful and sturdy attachment has been provided for a commercial automobile jack to render it easier for use with vehicles for lifting action thereon.

While two complete embodiments of the invention have been disclosed herein, it will be appreciated that modification of these particular embodiments of the invention may be resorted to without departing from the scope of the invention as defined in the appended claims.

We claim:

1. An attachment for an automobile jack having a support platform, which attachment comprises a securing plate having a downwardly extending inwardly overhanging fixedly positioned edge flange on an edge thereof, a pair of side members with downwardly extending and inwardly overhanging flanges thereon, an extension channel member, said securing plate having pairs of diagonally inwardly extending slots therein extending towards said edge flange, said channel member having pairs of longitudinally extending slots therein overlying portions of said slots in said securing plate at all times, means extending through overlapped portions of said slots in said channel member and securing plate to affix said side members to said securing plate and to said channel member centered with relation thereto, said securing plate and side members being engageable with a support platform of an automobile jack, and support arms carried by said channel member for engaging an automobile for lifting action thereon.

2. An attachment for an automobile jack having a support platform, which attachment comprises a securing plate having a downwardly extending inwardly overhanging edge flange on one edge portion thereof, a pair of side members with downwardly extending and inwardly overhanging flanges thereon associated with a pair of opposed edge portions of said securing plate and not including said one edge portion, an extension member, said securing plate being engageable with a support platform of an automobile jack, said securing plate having pairs of diagonally inwardly extending slots therein extending towards said edge flange, said extension member having pairs of longitudinally extending slots therein overlying portions of said slots in said securing plate at all times, and means extending through overlapped portions of said slots in said extension member and securing plate to affix said side members to said securing plate and extension member centered with relation thereto, said securing plate at the edge portion thereof opposed to said one edge portion having a generally upwardly slanted lip thereon to facilitate slidably positioning such securing plate on a support platform of an automobile jack, said extension member transmitting applied load to said jack support platform.

3. An attachment for an automobile jack having a support platform, which attachment comprises a securing plate having an integral downwardly extending inwardly overhanging edge flange on an edge thereof and with the remainder of said securing plate being of planar form, a pair of side members with downwardly extending and inwardly overhanging flanges thereon positioned adjacent second and third edges of said securing plate, an extension member, said securing plate being engageable with a support platform of an automobile jack by said edge flange and side member flanges engaging therewith, said securing plate having diagonally inwardly extending slots therein extending towards said edge flange, said extension member having longitudinally extending slots therein overlying portions of said slots in said securing plate at all times, means extending through overlapped portions of said slots in said extension member and securing plate to affix said side members to said securing plate and to said extension member centered with relation thereto and support means carried by said extension member offset from said securing plate for engaging an automobile for lifting action thereon.

References Cited in the file of this patent

UNITED STATES PATENTS

| | | |
|---|---|---|
| 750,245 | Arpin | Jan. 26, 1904 |
| 852,081 | Skelley | Apr. 30, 1907 |
| 1,813,045 | Franks | July 7, 1931 |
| 1,978,471 | Mizer et al. | Oct. 30, 1934 |
| 2,439,036 | Bohnsack | Apr. 6, 1948 |
| 2,649,933 | Hecker | Aug. 25, 1953 |